United States Patent
Arel et al.

(10) Patent No.: US 6,811,376 B2
(45) Date of Patent: Nov. 2, 2004

(54) ACTUATION SYSTEM FOR A CONTROLLABLE PITCH PROPELLER

(75) Inventors: David V. Arel, Granby, CT (US); Robert Perkinson, Somers, CT (US); David Danielson, Suffield, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 207 days.

(21) Appl. No.: 10/102,478

(22) Filed: Mar. 19, 2002

(65) Prior Publication Data

US 2003/0180146 A1 Sep. 25, 2003

(51) Int. Cl.$^7$ ............................................. B64C 11/38
(52) U.S. Cl. .................................. 416/46; 416/155
(58) Field of Search ............................ 416/1, 46, 47, 416/48, 155, 156, 159, 162, 38

(56) References Cited

U.S. PATENT DOCUMENTS

| | | | |
|---|---|---|---|
| 2,934,154 A | * | 4/1960 | John ............................ 416/42 |
| 2,995,190 A | | 8/1961 | Chilman |
| 3,439,745 A | * | 4/1969 | Leonard et al. ................ 416/46 |
| 4,645,420 A | * | 2/1987 | Warner ......................... 416/48 |
| 4,756,667 A | | 7/1988 | Wyrostek et al. |
| 4,893,989 A | * | 1/1990 | Carvalho ................. 416/157 R |
| 4,907,992 A | * | 3/1990 | Cavallaro et al. ........ 416/157 R |
| 5,037,271 A | | 8/1991 | Duchesneau et al. |
| 5,897,293 A | | 4/1999 | Arel et al. |
| 6,059,528 A | | 5/2000 | Danielson et al. |
| 6,077,040 A | | 6/2000 | Pruden et al. |
| 6,085,870 A | | 7/2000 | Wingate et al. |
| 6,149,166 A | | 11/2000 | Struss et al. |
| 6,261,062 B1 | | 7/2001 | Amerling et al. |
| 6,422,816 B1 | | 7/2002 | Danielson |

FOREIGN PATENT DOCUMENTS

| | | |
|---|---|---|
| EP | 0 387 183 A2 | 9/1990 |
| GB | 2 347 974 A | 9/2000 |

OTHER PUBLICATIONS

PCT International Search Report, dated Jul. 9, 2003.

* cited by examiner

*Primary Examiner*—Edward K. Look
*Assistant Examiner*—Igor Kershteyn
(74) *Attorney, Agent, or Firm*—Carlson, Gaskey & Olds

(57) ABSTRACT

A propeller control system provides for actuation through supply pressure only. A transfer bearing thereby requires only a single land. The supply pressure is metered at a pitch change valve within the rotating propeller shaft downstream of the transfer bearing to provide hydraulic pressure for actuation and control. A feather override mode is provided by energizing a feathering solenoid. The increased supply pressure changes the hydraulic force balance of the pitch change valve to allow the increased supply pressure into a Coarse Pitch chamber and simultaneously allow fluid within the Fine Pitch chamber to flow to drain pressure. The flow to drain changes the hydraulic balance on the Pitch Change Actuator Piston to drive a pitch link attached to each propeller blade and thereby change the pitch thereof towards coarse pitch.

29 Claims, 5 Drawing Sheets

ACTUATION SYSTEM FOR A CONTROLLABLE PITCH PROPELLER

BACKGROUND OF THE INVENTION

The present invention relates to a propeller control system, and more particularly to an electronic/hydraulic control system for propeller blade angle control which minimizes the number of pressures which pass through a transfer bearing.

Common variable pitch propeller systems are actuated through metered hydraulic pressures generated in the stationary field of the engine and transferred into the rotational field of the propeller blades through a transfer bearing. Typically, hydraulic pressures required to adjust propeller blade pitch angle are supplied directly from the transfer bearing to a coarse pitch and a fine pitch chamber of the pitch change actuator to provide propeller pitch control. A multiple of additional pressures are also supplied through the transfer bearing to assure backup and feathering pressures which protect the propeller system against uncommanded blade angle excursions. Each of these pressures are separately communicated through the transfer bearing.

The transfer bearing must communicate the multiple of pressures from the stationary field to the rotational field while minimizing leakage. As the conventional transfer bearing supplies appropriately metered hydraulic pressure directly to each particular propeller pitch change system, any leakage may degrade the accuracy of the pitch change system. Conventional transfer bearings are therefore relatively complicated and critical systems. Moreover, the greater the number of pressures which must pass through the transfer bearing, the greater the complexity and expense thereof.

Accordingly, it is desirable to provide a propeller control system which minimizes the number of pressures which are communicated through a transfer bearing. It is further desirable to assure effective protection against uncommanded blade angle excursions while minimizing the overall system size, weight, complexity and expense.

SUMMARY OF THE INVENTION

The propeller control system according to the present invention provides for actuation through a supply pressure only. A transfer bearing thereby requires only a single land to provide supply pressure into the system for actuation and control. The supply pressure is metered at a pitch change valve within the rotating propeller shaft downstream of the transfer bearing. As the transfer bearing is upstream of the pitch change valve, leakage from the transfer bearing has minimal effect upon the accuracy of the system. Although only a supply pressure is output from the main pump other pressures are provided within the pitch change valve through particular orifice and valve sizing.

A main pump provides supply pressure to the transfer bearing through a pressure regulating valve. From the transfer bearing, supply pressure is provided to the pitch change valve. The pitch change valve translates to selectively communicate a coarse pitch change pressure and a fine pitch change pressure to supply pressure or drain pressure. Generally, by selectively communicating coarse pitch change pressure and fine pitch change pressure to supply pressure or drain pressure, speed governing, synchrophasing, beta control, feathering and unfeathering of the propeller blades are provided.

In the event of a failure, a backup mode of moving propeller blade angle in the coarse pitch direction (towards feather) is provided by the present invention. Movement towards the coarse pitch direction is the 'fail-safe' action for propellers. A rotating controller and/or a separate non-rotating propeller backup control commands an increase in propeller blade angle if at least any of the following conditions are detected: a) propeller overspeed condition, b) propeller blade angle below the minimum in-flight value during a flight, or c) receipt of a feather command from the cockpit.

The command to increase the propeller blade angle is an electrical signal that energizes a feathering solenoid. Actuation of the feathering solenoid increases the supply pressure within the system.

The increased supply pressure changes the hydraulic force balance of the pitch change valve to causes a feather actuating valve to move forward relative a pitch change valve sleeve until a feather override orifice between supply pressure and a Feather Override Chamber is closed. The Feather Override Chamber is connected to drain pressure and the pressure within the Feather Override Chamber drops to drain pressure. The balance of forces will be rapidly changed causing the Pitch Change Valve Spool to translate aft of its starting position. In response, a coarse pitch pressure metering window is opened to allow fluid at the increased supply pressure into the Coarse Pitch chamber while simultaneously opening a Fine Pitch Pressure Metering Window to allow fluid within a Fine Pitch chamber to flow to drain pressure. The flow to drain changes the hydraulic balance on a Pitch Change Actuator Piston and drives a pitch link attached to each propeller blade to thereby change the pitch thereof towards coarse pitch. The feather override mode will be maintained until either a) the pitch change actuator piston actuator reaches the feather position and contacts a mechanical feather stop, or b) the controller de-energizes the feathering solenoid because the hazardous condition no longer exists.

Accordingly, the present invention provides a propeller control system which minimizes the number of pressures which are communicated through a transfer bearing, assures effective protection against uncommanded blade angle excursions, and reduces the overall system size, weight, complexity and expense.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
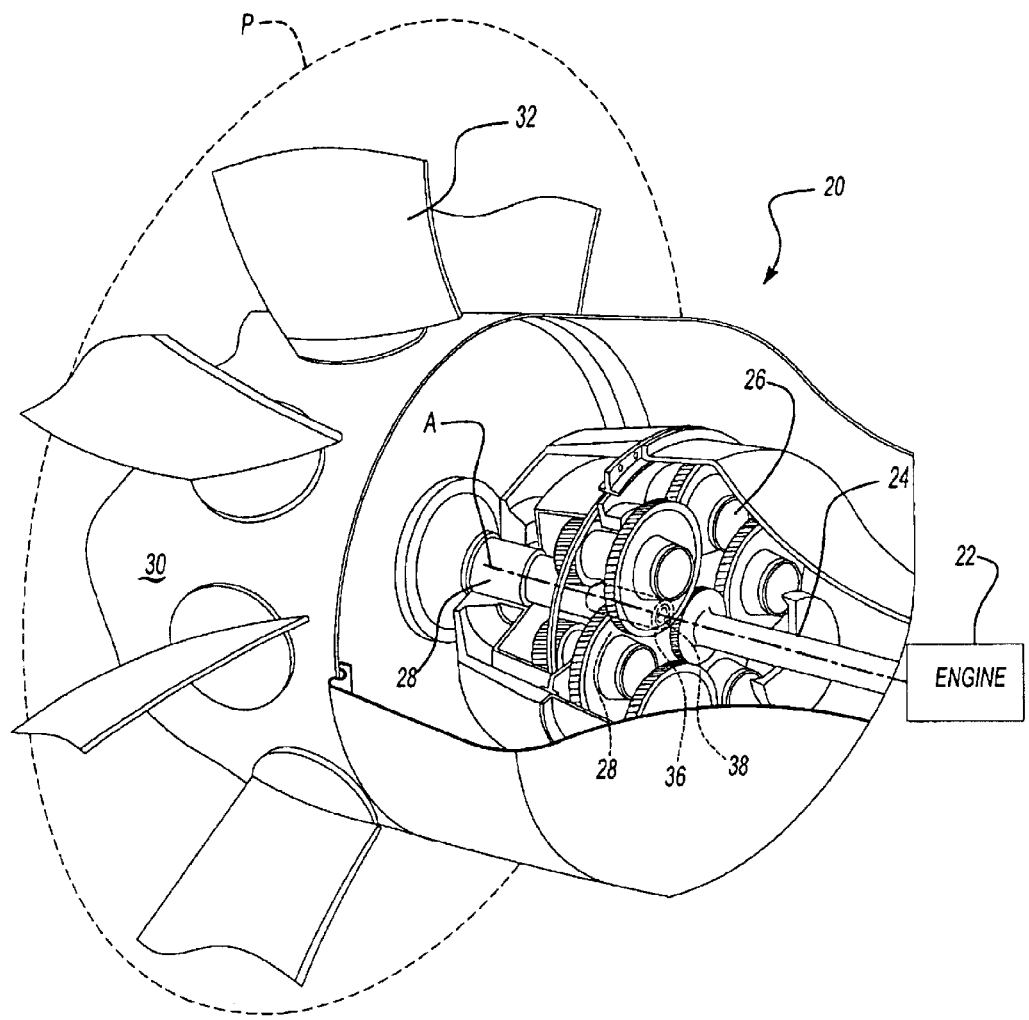
FIG. 1 is a general perspective view an exemplary gas turbine turboprop engine embodiment for use with the present invention.

FIG. 1 illustrates a general perspective view of a propeller control system 20 including a gas turbine engine (illustrated schematically at 22) which rotates a turbine output shaft 24 at a high speed. The turbine output shaft 24 drives a gear reduction gearbox (illustrated somewhat schematically at 26) which decrease shaft rotation speed and increase output torque. The gearbox 26 drives a propeller shaft 28 which rotates a propeller hub 30 and a plurality of propeller blades 32 which extend therefrom. Typically, the turbine output shaft 24 rotates in one direction while the propeller shaft 28 rotates in an opposite direction.

Preferably, the turbine output shaft 24 and the propeller shaft 28 rotate about a common axis A. Axis A is substantially perpendicular to a plane P which is defined by the propeller blades 32. Located substantially between the turbine output shaft 24 and the propeller shaft 28 is a permanent magnet alternator (PMA) 34 which rotates about axis A to provide electrical power directly to the rotating propeller hub 30 and blades 32. For further understanding of the PMA associated components thereof, attention is directed to U.S. patent application Ser. No. 10/098,804 filed Mar. 15, 2000 and entitled "Permanent Magnet Alternator For A Gas Turbine Engine" which is assigned to the assignee of the instant invention and which is hereby incorporated herein in its entirety.

Figure 2A:
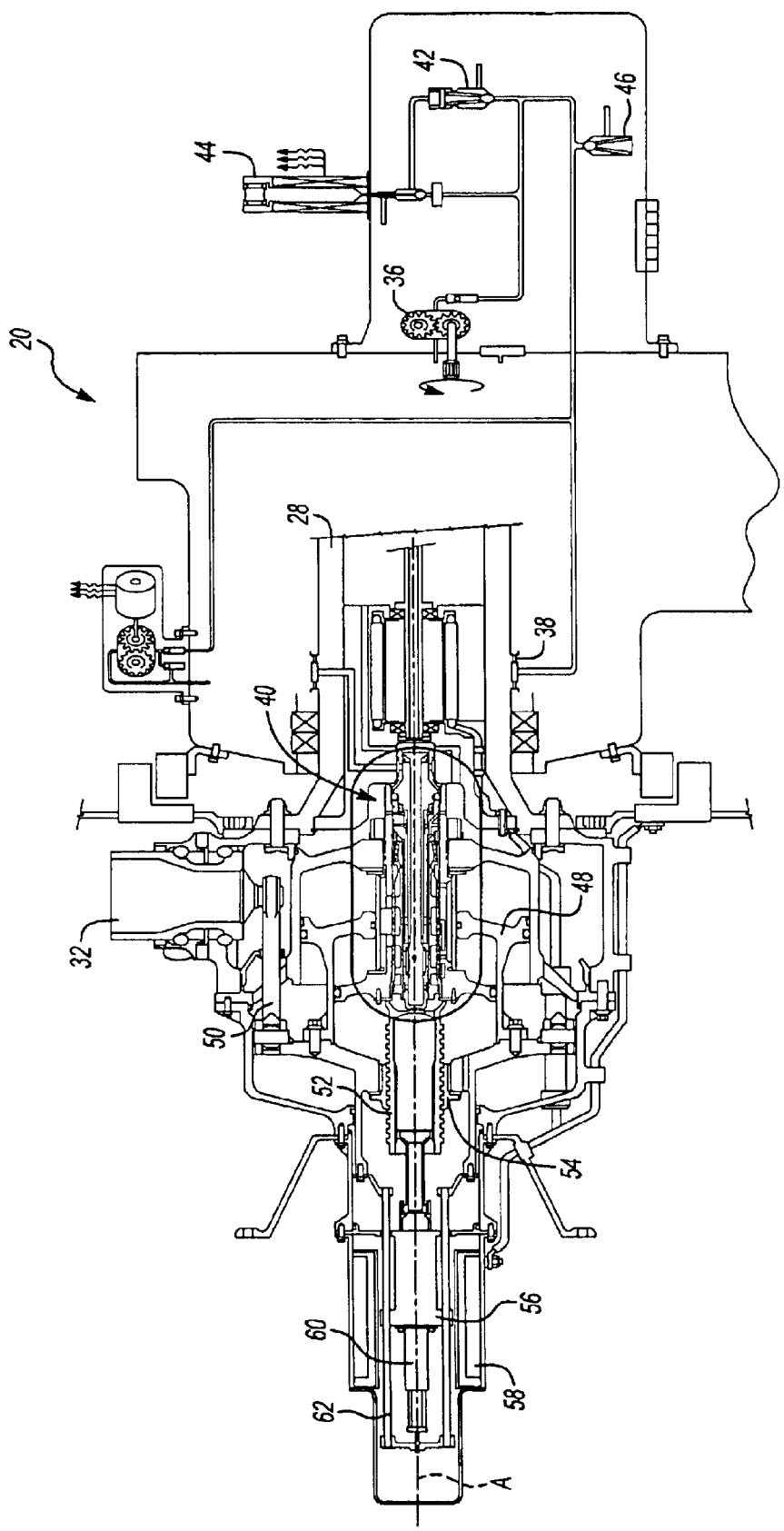
FIG. 2A is a sectional view of a turboprop system illustrating the electronic/hydraulic control system.

Referring to FIG. 2A, a schematic sectional view of the propeller control system 20 is illustrated. A main pump 36, for actuating the various mechanism disclosed herein, provides hydraulic pressure. Main pump 36 provides a pressure indicated generally by the appropriately shaded areas and more specifically by the $P_{subscript}$ designations, wherein $P_s$ is supply pressure, and $P_D$ is drain pressure.

The present invention advantageously provides for actuation through supply pressure $P_s$ only. A transfer bearing 38 thereby requires only a single land to provide hydraulic pressure into the system 20 for actuation and control. The supply pressure $P_s$ is metered at a pitch change valve 40 (also illustrated in FIG. 2B) within the rotating propeller shaft 28 downstream of the transfer bearing 38. Hydraulic leakage is minimized which improves the pressure gain and increases accuracy of the system. Moreover, as the transfer bearing is upstream of the pitch change valve 40, leakage from the transfer bearing 38 has minimal effect upon the accuracy of the system 20. Although only a supply pressure $P_s$ is output from the main pump 36 other pressures such as coarse pitch change pressure $P_C$, fine pitch change pressure $P_f$, a first metered pressure $P_{m1}$ and a second metered pressure $P_{m2}$ are provided within the pitch change valve 40 through particular orifice and valve sizing.

The main pump 36 provides fluid pressure to the transfer bearing 38 through a pressure regulating valve 42. Typically the main pump 36 provides fluid at a pressure above the supply pressure $P_s$ such that at least some fluid will circulate through the pressure regulating valve 42 and be reduced to the drain pressure $P_D$ in the drain system. Drainage from the pitch change valve 40 is communicated through the center of the pitch change valve 40 along axis A where it is communicated through the gearbox 26 (FIG. 1) and back into the drain system for access by the main pump 36. A feathering solenoid 44 and a high pressure relief valve 46 are also preferably located between the main pump 36 and the transfer bearing 38.

From the transfer bearing 38, supply pressure $P_s$ is provided to the pitch change valve 40. The pitch change valve 40 translates along axis A to selectively communicate the coarse pitch change pressure $P_C$ and fine pitch change pressure $P_f$ to supply pressure $P_s$ and drain pressure $P_D$. Generally, by selectively communicating coarse pitch change pressure $P_C$ and fine pitch change pressure $P_f$ to supply pressure $P_s$ or drain pressure $P_D$ to provide speed governing, synchrophasing, beta control, feathering and unfeathering of the propeller blades 32.

Preferably, a pitch change actuator piston 48 is located between a coarse pitch actuator chamber PC and a fine pitch actuator chamber PF which are respectively supplied with coarse pitch change pressure $P_C$ and fine pitch change pressure $P_f$ such that the piston 48 is driven by differential pressure therebetween. The pitch change actuator piston 48 translate along axis A to drive a pitch link 50 attached to each propeller blade 32 to thereby control the pitch thereof.

The pitch change valve 40 is axially translated in response to a pitch lock screw 52 which rotates within a threaded pitch nut 54. Pitch nut 54 is mounted to the pitch change actuator piston 48 such that the pitch lock screw 52 and threaded pitch nut 54 axially slide in response to movement of the pitch change actuator piston 48.

A pitch change motor 56 drives the pitch lock screw 52 in response to a rotating controller 58. The pitch lock screw 52 changes a hydraulic fluid balance within the pitch change valve 40 as will be further described below to provide a hydraulic servo link. That is, a pitch lock gap is maintained between the pitch lock screw 52 and the pitch change actuator piston 48. The polar moment of inertia, which must be rotated by the pitch change motor 56 is minimized. This provides for improved precision for synchrophasing accuracy and dynamic response over heretofore mechanical drives. Moreover, should a complete failure of hydraulic pressure occur the pitch lock gap is eliminated and the pitch lock screw 52 mechanically blocks movement of the pitch change actuator piston 48 to lock the propeller blades in their last pitch position.

The controller 58 is located within the rotational field for rotation with the propeller shaft 28. Preferably, a beta feedback linear variable differential transformer (LVDT 60) identifies the position of the propeller blades 32 through a mechanical linkage 62 connected to the pitch change actuating piston 48. The controller 58 thereby receives a signal of actual propeller blade angle through communication with the LVDT 60.

Preferably, controller 58 is a dual channel microprocessor based unit, having a primary channel and a backup channel, to provide closed loop control of the pitch of propeller blades 32. The controller 58 functions to control speed governing, synchrophasing, beta control, feathering and unfeathering. In addition to these functions, the unit detects, isolates and accommodates control system faults. The controller 58 is preferably programmed in a known manner to perform the functions as set forth above. Controller 58 drives pitch change motor 56 to drive the pitch lock screw 52 and control translation of the pitch change valve 40, described in detail below.

Figure 2B:
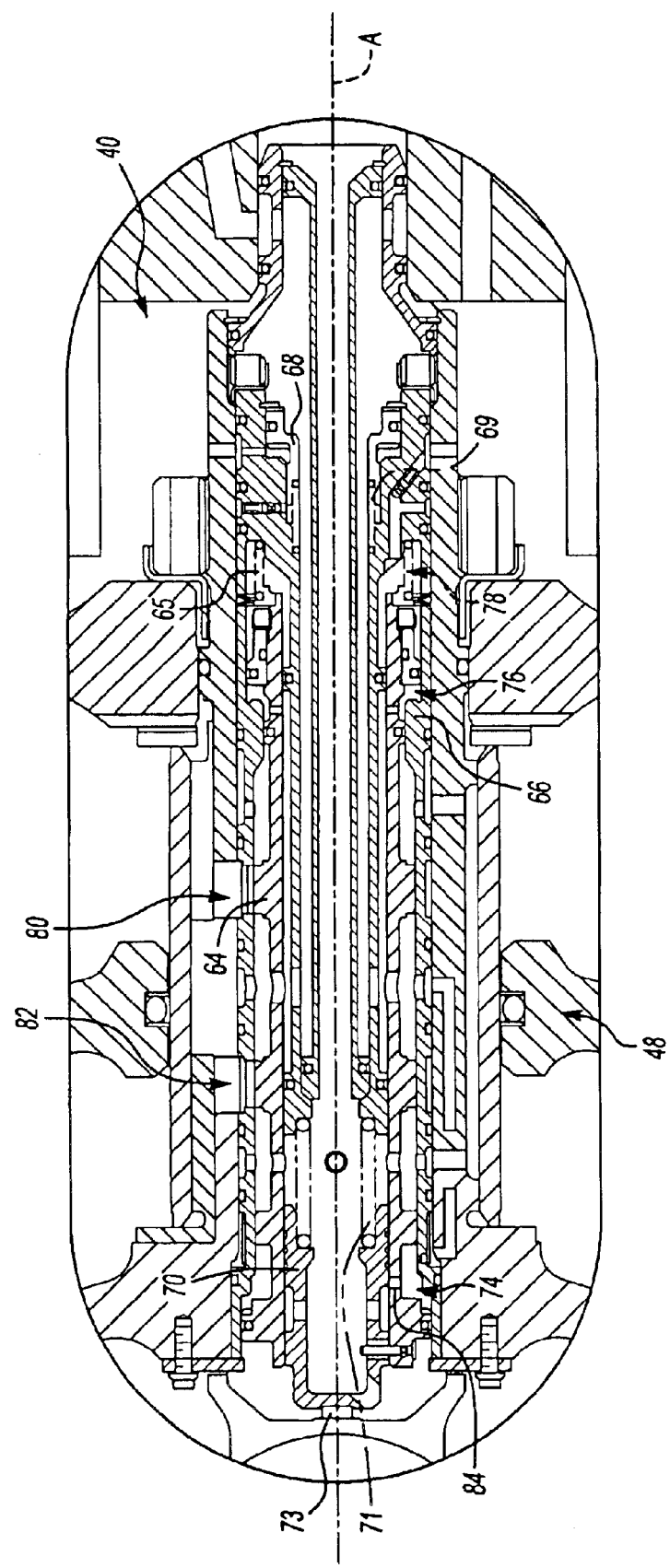
FIG. 2B is an expanded view of a pitch change valve illustrated in FIG. 2A in a first normal governing mode.

Referring also to FIG. 2B, the pitch change valve 40 includes a pitch change valve spool 64, pitch change valve sleeve 66, a feather actuating valve 68, and a pitch change signal valve 70. The pitch change valve sleeve 66 is axially fixed within the propeller shaft 28. The pitch change valve spool 64 is axially movable along axis A relative the pitch change valve sleeve 66. The pitch change valve spool 64 is biased relative the pitch change valve sleeve 66 by a spring 65 or the like. The feather actuating valve 68 is biased relative the pitch change valve sleeve 66 by a spring 69 or the like. The pitch change signal valve 70 is biased relative the pitch change valve sleeve 66 by a spring 71 or the like. The pitch change signal valve 70 is preferably located adjacent the forward end of the pitch change valve spool 64 and opposite the feather actuating valve 68 which is located adjacent the aft end of the pitch change valve spool 64.

A predetermined pressures within a pitch change signal chamber 74 (first metered pressure $P_{m1}$), a supply pressure chamber 76, and a feather override chamber 78 (second metered pressure $P_{m2}$) maintain the pitch change valve spool 64 in a hydraulically balanced position relative the pitch change valve sleeve 66. The first metered pressure $P_{m1}$ and the second metered pressure $P_{m2}$ are obtained from the single supply pressure $P_s$ by appropriate orifice, spring and valve sizing as generally known.

As the pitch change motor 56 rotates the pitch lock screw 52 (FIG. 2A), the pitch change lock screw 52 drives the pitch change signal valve 70 aft (toward the transfer bearing 38) relative the pitch change valve spool 64. Preferably, a button 73 provides a point contact between the pitch lock screw 52 and the pitch change valve sleeve 66. This movement opens a pitch change signal metering window 84 between the pitch change signal chamber 74 and drain pressure. Pressure within the pitch change signal chamber 74 decreases from the original balanced first metered pressure $P_{ml}$. This reduction of the first metered pressure $P_{m1}$ changes the entire balance of forces which maintained the pitch change valve spool 64 relative the pitch change valve sleeve 66. As a result, the pitch change valve spool 64 moves aft relative the pitch change valve sleeve 66.

The pitch change valve spool 64 continues to moves aft until the pitch change signal metering window 84 between the pitch change signal chamber 74 and drain closes sufficiently to raise the hydraulic pressure in the pitch change signal chamber 74 to its original value. That is, the pitch change valve spool 64 moves aft until the pitch change valve spool 64 has returned to it original position relative the pitch change signal valve 70. Once the pressure returns to its original value (first metered pressure $P_{m1}$) the balance of forces applied to the pitch change valve spool 64 is restored and movement of the pitch change valve spool 64 stops at a new position. The new position correlates to a new commanded propeller blade pitch angle.

At this new position the pitch change valve spool 64 position (aft of the starting position), a coarse pitch pressure metering window 80 located between the Pitch Change Valve Spool 64 and the Pitch Change Valve Sleeve 66 opens to allow fluid at supply pressure $P_s$ into the Coarse Pitch chamber PC. Simultaneously, a Fine Pitch Pressure Metering Window 82 opens to allow fluid within the Fine Pitch chamber PF to flow to drain pressure. This flow changes the force balance on the Pitch Change Actuator Piston 48 which translates forward along axis A to drive the pitch link 50 (FIG. 2A) attached to each propeller blades 32 and thereby change the pitch thereof toward the desired increased (coarser) blade pitch angle.

As the Pitch Change Actuator Piston 48 moves forward, the Pitch change Lock Screw 52 moves forward along axis A away from the pitch change signal valve 70. The pitch change lock screw 52 moves forward without rotating as the pitch change lock screw 52 moves with the pitch change actuator piston 48 which is connected thereto through the pitch change nut 54 (FIG. 2A). The LVDT 60 (FIG. 2A) is also displaced through connection between the mechanical linkage 62 and the pitch change actuating piston 48. The Pitch Change Signal Valve 70 moves forward, closing the Pitch Change Signal Metering Window 84 off from drain pressure. The pressure within the Pitch Change Signal Chamber 74 increases as the Pitch Change Valve Spool 64 moves forward. The pitch change signal metering window 84 continues to close until the pressure within the pitch change signal chamber 74 returns to the original value (first metered pressure $P_{m1}$). This action continues until the Pitch Change Valve Spool 64 reaches a position where both the Fine Pitch metering window 82 and the Coarse Pitch Pressure Metering Window 80 are again closed (as illustrated in FIG. 2B).

At this point, all valves are once again at null and all movement stops at the desired increased (coarser) blade pitch angle. That is, when a pitch change command (rotation of the pitch change motor) is applied to the system to open a valve(s), the resulting motion will: a) produce the desired motion, and b) use that motion as a feedback to return the valve(s) to null once the desired blade angle is obtained.

Of course, rotation of the pitch change motor in the opposite direction will cause the pitch change valve spool 64 to moves forward which results in the pitch change actuator piston 48 moving aft to move the propeller blades in the decrease (Fine) blade angle.

Figure 3A:
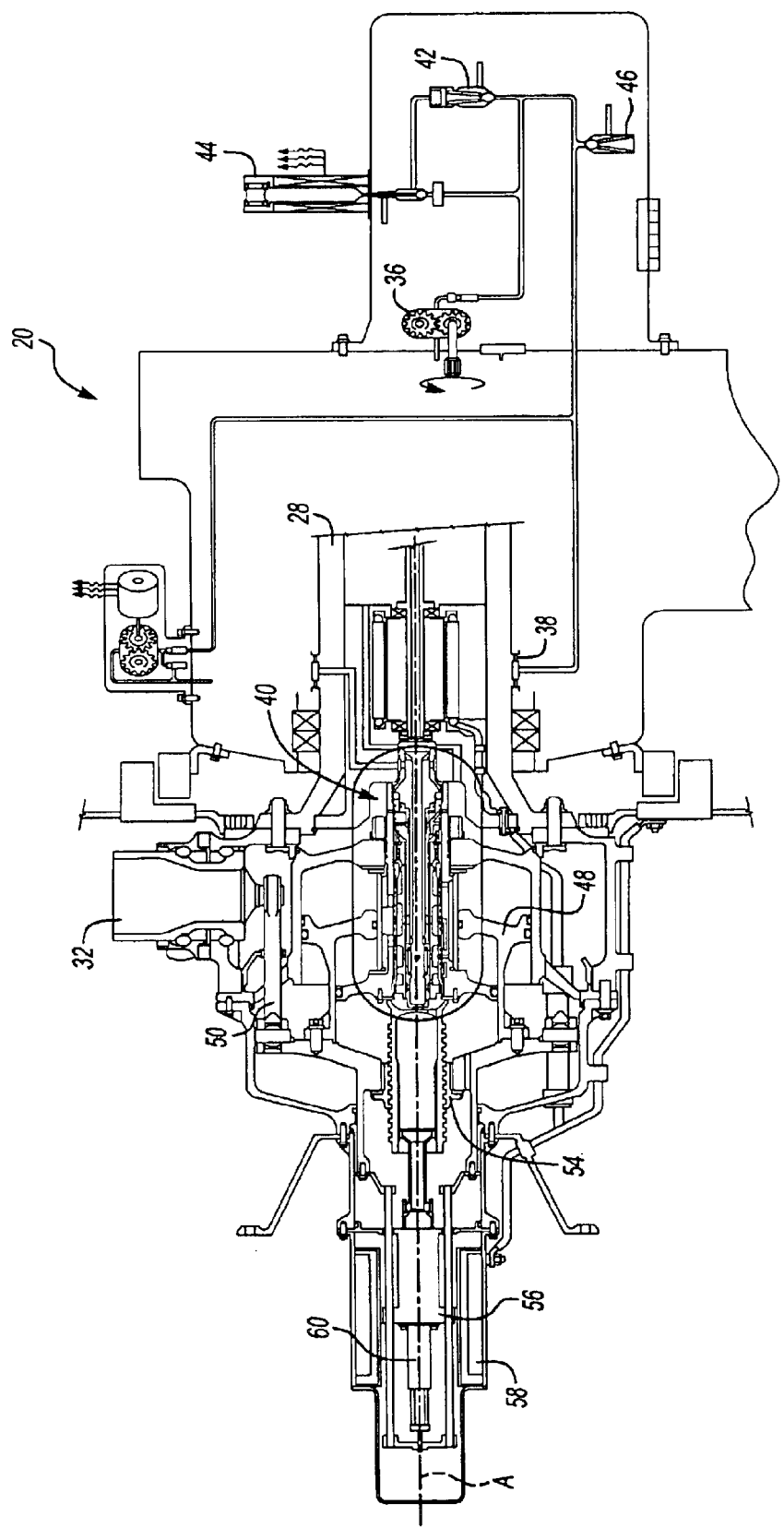
FIG. 3A is a sectional view of a turboprop system illustrating the electronic/hydraulic control system.

Referring to FIG. 3A, a feather override mode is illustrated. In the event of a failure such as of the propeller power generator, electronic control, pitch change motor, or other component, a backup mode of moving the propeller blade angle in the coarse pitch direction (towards feather) is provided by the present invention. Movement towards the coarse pitch direction is the 'fail-safe' direction for propellers. Preferably, the controller 58 and/or a separate non-rotating propeller backup control commands an increase in propeller blade angle if at least any of the following conditions are detected: a) propeller overspeed condition, b) propeller blade angle falls below the minimum in-flight value during a flight, or c) receipt of a feather command from the cockpit.

The command to increase the propeller blade angle is preferably an electrical signal that energizes the feathering solenoid 44. Actuation of the feathering solenoid 44 will provide supply pressure to move the Pressure Regulating Valve 42 to its reset position. This increases the reference force on the Pressure Regulating Valve spring, increasing the pressure required to regulate Supply Pressure. That is, supply pressure within the system is increased as less fluid is communicated through the pressure regulating valve 42.

Figure 3B:
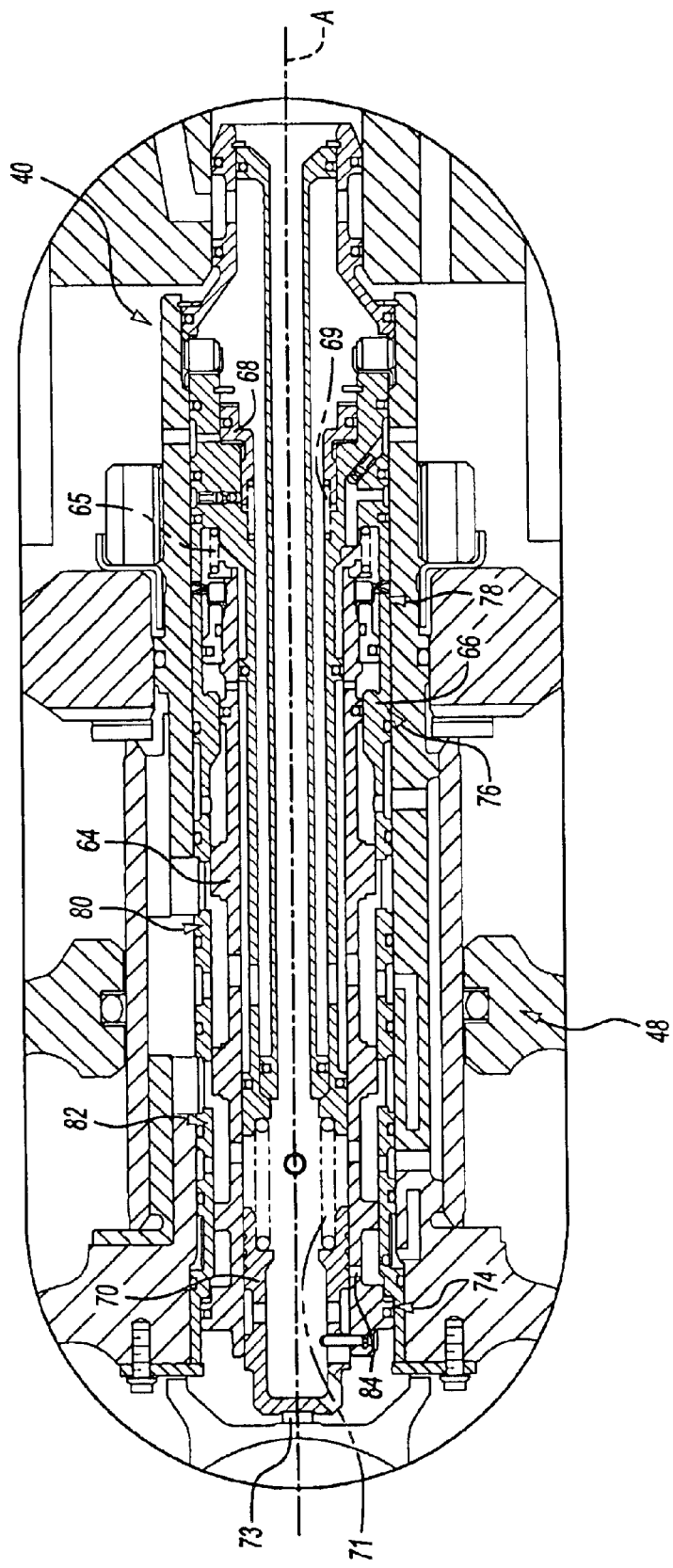
FIG. 3B is an expanded view of a pitch change valve illustrated in FIG. 3A in a feather override mode.

Referring to FIG. 3B, the higher Supply Pressure changes the hydraulic balance of the pitch change valve 40 and causes the Feather Actuating Valve 68 to move forward relative the pitch change valve sleeve 66, compressing spring 69, until a first feather override orifice 77 between supply pressure and the Feather Override Chamber 78 is closed. Since the Feather Override Chamber 78 (FIG. 2B; second metered pressure $P_{m2}$) is now connected to drain pressure (through a second feather override orifice 79), pressure in the Feather Override Chamber 78 drops to the value of drain pressure. Thus, the balance of forces on the Pitch Change Valve Spool 64 is rapidly changed causing the Pitch Change Valve Spool 64 to move aft toward the transfer bearing 38.

At this new position, the pitch change valve spool 64 is aft of the starting position. The coarse pitch pressure metering window 80 is opened to allow fluid at supply pressure into the Coarse Pitch chamber PC while simultaneously opening the Fine Pitch Pressure Metering Window 82 to allow fluid within the Fine Pitch chamber PF to flow to drain pressure. The decrease to drain pressure changes the hydraulic balance on the Pitch Change Actuator Piston 48 which translates along axis A to drive the pitch link 50 (FIG. 3A attached to each propeller blade 32 and thereby change the pitch thereof towards coarse pitch. In this backup mode, the self-nulling features of the pitch change valve are bypassed and the pitch change actuator piston 48 moves directly toward feather.

The feather override mode motion will continue until either a) the pitch change actuator piston 48 reaches the feather position and contacts a mechanical feather stop, or b) the controller 58 de-energizes the Feathering solenoid 44 because the hazardous condition no longer exists. That is, the propeller blades 32 are provided with a temporary "boost" toward coarse pitch. Preferably, the controller 58 provides such a boost whenever the hazardous condition is transitory, but will allow full actuation to feather should continuous predetermined hazardous condition criterion are met.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A propeller control system comprising:
   a propeller shaft which rotates about a first axis to drive a propeller hub and a plurality of propeller blades extending therefrom;
   a pitch change valve mounted along said first axis in a hydraulic balance, said pitch change valve movable along said axis in response to upset of said hydraulic balance, axial movement of said pitch change valve operable to change a pitch of said plurality of propeller blades;
   a pitch change motor which rotates a pitch lock screw to axially adjust said pitch change valve; and
   a transfer bearing comprising a single land for supplying a supply pressure from a stationary field to said pitch change valve within a rotational field, said supply pressure operable to maintain said hydraulic balance.

2. The propeller control system as recited in claim 1, further comprising a feathering solenoid in communication with a main pump and said transfer bearing.

3. The propeller control system as recited in claim 2, further comprising a controller in communication with said feathering solenoid, said controller operable to actuate and deactivate said feathering solenoid.

4. The propeller control system as recited in claim 3, wherein actuation of said feathering solenoid increases said supply pressure.

5. The propeller control system as recited in claim 4, wherein said pitch change valve comprises a feathering valve movable relative to a pitch change valve spool, said feathering valve movable relative to said pitch change valve spool in response to said increase in said supply pressure.

6. The propeller control system as recited in claim 5, wherein actuation of said feathering valve upsets said hydraulic balance of said pitch change valve and change the pitch of said plurality of propeller blades toward coarse pitch.

7. The propeller control system as recited in claim 1, wherein said supply pressure is metered into a first metered pressure within a pitch change signal chamber formed between a pitch change signal valve and a pitch change valve spool and into a second metered pressure within a feather override chamber formed between a feather actuating valve and said pitch change valve spool.

8. The propeller control system as recited in claim 1, further comprising a controller mounted within said rotational field.

9. The propeller control system as recited in claim 8, further comprising a linear variable differential transformer in communication with said controller.

10. The propeller control system as recited in claim 9, wherein said linear variable differential transformer identifies the pitch of the plurality of propeller blades through a mechanical linkage.

11. The propeller control system as recited in claim 10, wherein said mechanical linkage is attached to a pitch change actuating piston, said pitch change actuating piston movably mounted between a coarse pitch actuator chamber and a fine pitch actuator chamber.

12. The propeller control system as recited in claim 1, wherein said pitch change valve comprises a pitch change signal valve movable relative to a pitch change valve spool, said pitch lock screw operable to upset said hydraulic balance between said pitch change signal valve and said pitch change valve spool.

13. The propeller control system as recited in claim 1, wherein said pitch lock screw rotates within a threaded pitch nut mounted to a pitch change actuator piston such that said pitch lock screw and said threaded pitch nut axially slide in response to movement of the pitch change actuator piston.

14. The propeller control system as recited in claim 13, wherein said pitch change lock screw moves without rotation.

15. A propeller control system comprising:
   a propeller shaft which rotates about a first axis to drive a propeller hub and a plurality of propeller blades extending therefrom;
   a pitch change actuating piston between a coarse pitch actuator chamber and a fine pitch actuator chamber, said pitch change actuating piston movable along said first axis in response to a differential pressure between said coarse pitch actuator chamber and a fine pitch actuator chamber, said pitch change actuating piston linked to said plurality of propeller blades to change the pitch thereof;
   a pitch change valve mounted along said first axis in a hydraulic balance, said pitch change valve movable along said axis in response to upset of said hydraulic balance, movement of said pitch change valve operable to selectively communicate each of said coarse pitch actuator chamber and said fine pitch actuator chamber with either a supply pressure or a drain pressure;
   a transfer bearing comprising a single land for supplying said supply pressure from a stationary field to said pitch change valve within a rotational field, said supply pressure operable to maintain said hydraulic balance; and
   a feathering solenoid in communication with said transfer bearing, actuation of said feathering solenoid operable to increase said supply pressure and upset said hydraulic balance such that said coarse pitch actuator chamber communicates with said supply pressure and said fine pitch actuator chamber communicates with said drain pressure to change the pitch of said plurality of propeller blades toward coarse pitch.

16. The propeller control system as recited in claim 15, wherein said pitch change valve comprises a pitch change valve sleeve, a pitch change valve spool, a pitch change signal valve, and a feather actuating valve, said pitch change valve spool movable relative said pitch change valve sleeve and said pitch change signal valve and said feather actuating valve movable relative said pitch change valve spool.

17. The propeller control system as recited in claim 16, wherein said supply pressure is metered into a first metered pressure within a pitch change signal chamber formed between said pitch change signal valve and said pitch change valve spool and into a second metered pressure within a feather override chamber formed between said feather actuating valve and said pitch change valve spool.

18. The propeller control system as recited in claim 16, further comprising a pitch lock screw adjacent said pitch change signal valve, rotation of said pitch lock screw operable to upset a metered pressure within a pitch change signal chamber formed between said pitch change signal valve and said pitch change valve spool and hydraulically drive said pitch change valve spool relative said pitch change valve sleeve.

19. The propeller control system as recited in claim 15, wherein said transfer bearing is mounted about said propeller shaft.

20. A method of controlling a propeller blade pitch comprising the steps of:
 (1) supplying a fluid at a first supply pressure to a pitch change valve to maintain the pitch change valve in a hydraulic balance;
 (2) mechanically upsetting the hydraulic balance of the pitch change valve through rotation of a pitch lock screw and a pitch change motor to axially move the pitch change valve and change a first pressure within a coarse pitch actuator chamber and a second pressure within fine pitch actuator; and
 (3) axially moving a pitch change actuating piston in response to said step (2), said pitch change actuating piston linked to a plurality of propeller blades to change the pitch thereof.

21. A method as recited in claim 20, further comprising the step of:
 supplying the fluid at a second supply pressure greater than the first supply pressure to upset the hydraulic balance of the pitch change valve to increase the first pressure and decrease the second pressure such that the pitch of the plurality of propeller blades move toward coarse pitch.

22. A method as recited in claim 20, further comprising the step of:
 self-nulling axial movement of the pitch change valve.

23. A method as recited in claim 20, further comprising the step of:
 selectively communicating each of the first pressure and the second pressure with the first supply pressure or a drain pressure in response to axially movement of the pitch change valve.

24. A propeller control system comprising:
 a propeller shaft which rotates about a first axis to drive a propeller hub and a plurality of propeller blades extending therefrom;
 a pitch change valve mounted along said first axis in a hydraulic balance, said pitch change valve movable along said axis in response to upset of said hydraulic balance, axial movement of said pitch change valve operable to change a pitch of said plurality of propeller blades;
 a transfer bearing comprising a single land for supplying a supply pressure from a stationary field to said pitch change valve within a rotational field, said supply pressure operable to maintain said hydraulic balance;
 a feathering solenoid in communication with a main pump and said transfer bearing; and
 a controller in communication with said feathering solenoid, said controller operable to actuate and deactivate said feathering solenoid to selectively increases said supply pressure.

25. A propeller control system comprising:
 a propeller shaft which rotates about a first axis to drive a propeller hub and a plurality of propeller blades extending therefrom;
 a pitch change valve mounted along said first axis in a hydraulic balance, said pitch change valve movable along said axis in response to upset of said hydraulic balance, axial movement of said pitch change valve operable to change a pitch of said plurality of propeller blades; and
 a transfer bearing comprising a single land for supplying a supply pressure from a stationary field to said pitch change valve within a rotational field, said supply pressure operable to maintain said hydraulic balance, said supply pressure is metered into a first metered pressure within a pitch change signal chamber formed between a pitch change signal valve and a pitch change valve spool and into a second metered pressure within a feather override chamber formed between a feather actuating valve and said pitch change valve spool.

26. A propeller control system comprising:
 a propeller shaft which rotates about a first axis to drive a propeller hub and a plurality of propeller blades extending therefrom;
 a pitch change valve mounted along said first axis in a hydraulic balance, said pitch change valve movable along said axis in response to upset of said hydraulic balance, axial movement of said pitch change valve operable to change a pitch of said plurality of propeller blades;
 a transfer bearing comprising a single land for supplying a supply pressure from a stationary field to said pitch change valve within a rotational field, said supply pressure operable to maintain said hydraulic balance; and
 a controller mounted within said rotational field.

27. A method of controlling a propeller blade pitch comprising the steps of:
 (1) supplying a fluid at a first supply pressure to a pitch change valve to maintain the pitch change valve in a hydraulic balance;
 (2) mechanically upsetting the hydraulic balance of the pitch change valve to axially move the pitch change valve and change a first pressure within a coarse pitch actuator chamber and a second pressure within fine pitch actuator;
 (3) axially moving a pitch change actuating piston in response to said step (2), said pitch change actuating piston linked to a plurality of propeller blades to change the pitch thereof; and
 (4) supplying the fluid at a second supply pressure greater than the first supply pressure to upset the hydraulic balance of the pitch change valve to increase the first pressure and decrease the second pressure such that the pitch of the plurality of propeller blades move toward coarse pitch.

28. A method of controlling a propeller blade pitch comprising the steps of:
  (1) supplying a fluid at a first supply pressure to a pitch change valve to maintain the pitch change valve in a hydraulic balance;
  (2) mechanically upsetting the hydraulic balance of the pitch change valve to axially move the pitch change valve and change a first pressure within a coarse pitch actuator chamber and a second pressure within fine pitch actuator;
  (3) axially moving a pitch change actuating piston in response to said step (2), said pitch change actuating piston linked to a plurality of propeller blades to change the pitch thereof; and
  (4) self-nulling axial movement of the pitch change valve.

29. A method of controlling a propeller blade pitch comprising the steps of:
  (1) supplying a fluid at a first supply pressure to a pitch change valve to maintain the pitch change valve in a hydraulic balance;
  (2) mechanically upsetting the hydraulic balance of the pitch change valve to axially move the pitch change valve and change a first pressure within a coarse pitch actuator chamber and a second pressure within fine pitch actuator;
  (3) axially moving a pitch change actuating piston in response to said step (2), said pitch change actuating piston linked to a plurality of propeller blades to change the pitch thereof; and
  (4) selectively communicating each of the first pressure and the second pressure with the first supply pressure or a drain pressure in response to axially movement of the pitch change valve.

* * * * *